UNITED STATES PATENT OFFICE.

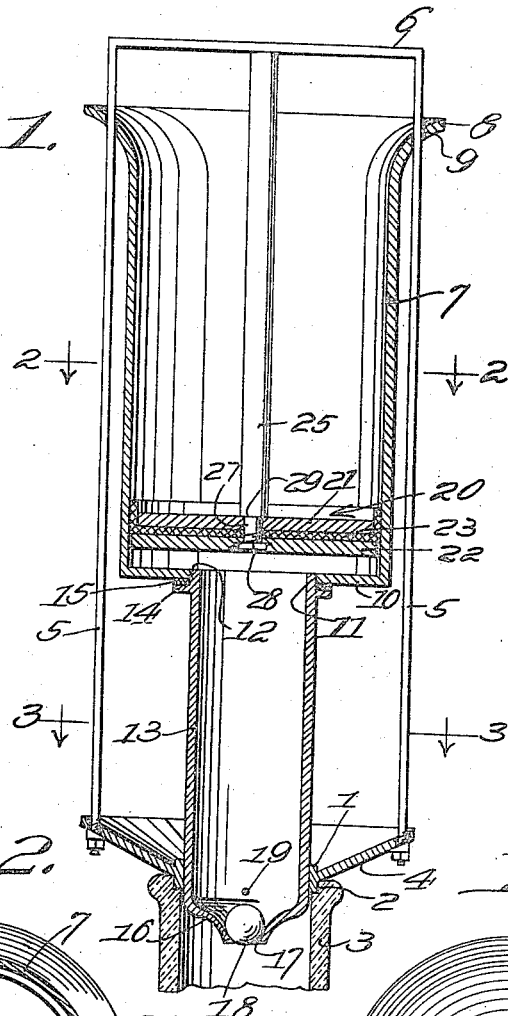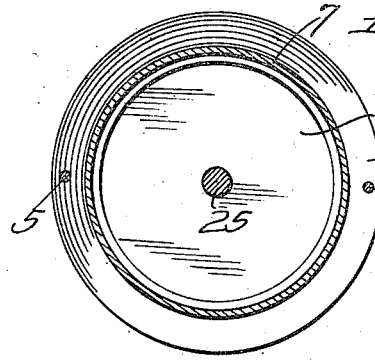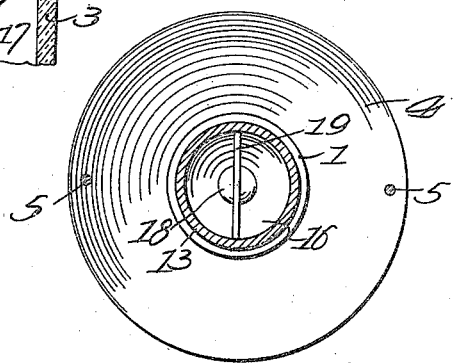

LEVI B. WARREN, OF BUTTERNUT, MICHIGAN.

CREAM-SKIMMING DEVICE.

1,269,348.

Specification of Letters Patent.  Patented June 11, 1918.

Application filed May 11, 1917. Serial No. 167,942.

*To all whom it may concern:*

Be it known that I, LEVI B. WARREN, a citizen of the United States, residing at Butternut, in the county of Montcalm and State of Michigan, have invented certain useful Improvements in Cream - Skimming Devices, of which the following is a specification, reference being had therein to the accompanying drawing.

The present invention has reference generally to cream separators and more particularly relates to a cream skimming device preferably though not necessarily adapted for skimming cream from milk bottles.

As the primary aim and object this invention contemplates the provision of an improved device of the character mentioned embodying novel coöperative cream withdrawing and containing means preferably adapted for arrangement on the mouth of a milk bottle so that during actuation the cream which is generally on top of the milk bottle will be drawn therefrom so that it may be subsequently dispensed in a separate container.

It is an additional and equally important object of the present invention to provide novel means for supporting the coöperative cream withdrawing and containing means above the mouth of the milk bottle or other receptacle from which it is desired to remove cream.

More particularly, the present invention contemplates the provision of improved means carried by the supporting frame for engagement with the shoulder of the mouth of the milk bottle so that the device may be effectively supported during actuation.

As a further improvement, the present invention embraces the provision of an improved cylinder slidably mounted on the frame and constructed to support the cream tube.

More specific objects of the present invention consist in the provision of an improved piston carried by the frame and coöperating with the cylinder for drawing cream through the tube into the cylinder during the actuation of the device; and to provide improved valve means in the tube for preventing a backflow of the cream therethrough.

Among the other aims and objects of the present invention may be recited the provision of a device of the character mentioned with a view to compactness, and in which the number of parts are few, the construction simple, the cost of production low and the efficiency high.

Other objects as well as the nature, characteristic features and scope of this invention will be more readily apparent from the following description taken in connection with the accompanying drawings and pointed out in the claims, forming a part of this specification.

The invention is clearly illustrated in the accompanying drawings, in which:—

Figure 1 is a vertical section showing the device in an operative position.

Fig. 2 is a transverse section taken on line 2—2 of Fig. 1, and

Fig. 3 is a transverse section taken on line 3—3 of Fig. 1.

Similar characters of reference are employed in all of the above described views, to indicate corresponding parts.

Referring now, more particularly, to the accompanying drawings there is provided an improved supporting frame consisting of an annular band 1 which is adapted for engagement with the shoulder 2 of a milk bottle 3 or other receptacle. A frusto-conical flange 4 projects outwardly from the shoulder and serves a purpose that will presently appear while vertical rods 5 project upwardly from opposite edges of the flange 4 and are connected at the upper end by a transversely extending handle 6 preferably formed integral therewith.

With a view toward providing improved means for withdrawing cream from the top of the milk bottle 3 a cylinder 7 is provided and has the upper end flared outwardly as at 8 and provided with opposed openings 9 through the medium of which the cylinder is slidably mounted on the rods 5 preparatory to the connecting of the rods to the flange 4. The lower end of the cylinder is formed with an end wall 10 which in turn is provided with a central opening 11 which is removably engaged preferably by threads 12 to one end of a cream conducting tube 13. An annular collar 14 is formed exteriorly of the tube adjacent its point of connection with the cylinder and serves as a means for removably clamping the gasket 15 to the bottom of the cylinder thus forming an air and watertight joint between the cylinder and the tube. The outer end of the tube is slidably arranged in close relation within the band 1 and terminates in an outwardly extending frusto-conical seat 16 at the apex of which is formed an opening 17. A ball valve 18 is arranged within the tube and coöperates with the seat to serve as a check for preventing a blackflow of cream that has been drawn through the tube. Suitable guarding means such as transversely extending intersecting wires 19 are employed for preventing undue movement of the valve 18 with respect to its seat. By the arrangement described it will be appreciated that a downward movement of the cylinder is limited by the flange 4. A piston indicated in its entirety by the numeral 20 is now provided and preferably consists of rigid circular plates 21 and 22 between which is arranged a flexible disk 23 preferably of leather, the edges 24 of which are projected beyond the outer edges of the plates 21 and 22 and cramped and bent upwardly and arranged against the outer edge of the plate 21. A piston rod 25 has one end rigidly connected to the handle 6 and the opposite end reduced as at 27 and arranged through alining openings in the plates 21 and 22 and the disk 23, all of which are clamped into substantially rigid relation with each other by means of a suitable adjusting element such as a nut 28 removably threaded on its reduced extremity and coöperating with the shoulder 29 formed when the end of the rod is reduced. It is to be appreciated that the length of the piston rod is such that when piston is arranged within the inner end of the cylinder the band 1 will be positioned near the outer end of the tube 13.

The mode of operation of the present invention may be reviewed as follows:

Assuming that the parts have been assembled in the manner described and as indicated in the drawings the band 1 is rested on the shoulder 2 while the frusto-conical seat 16 is positioned near the extreme upper end of the milk bottle whereupon by engaging the cylinder 7 and moving it downwardly the tube 13 will be moved in a corresponding direction into the bottle neck. During this movement owing to the fact that the piston 20 is rigid with the rod 25 which is in turn carried by the handle 6 a suction will be created so that the valve 17 will be lifted from its seat to permit of the cream which is at the top of the bottle being drawn into the tube. Of course, during the continued downward movement of the cylinder the suction will be continued so that the cream which is usually at the top of the milk bottle will be drawn or skimmed therefrom and enter the tube 13 and the cylinder. The guarding means serve to prevent unnecessary movement of the ball valve. When the piston 7 strikes the flange 4 sliding movement of the cylinder is limited and when this occurs the frusto-conical end of the tube will be positioned at the end of the cream in the top of the bottle. The valve, of course, automatically reseats itself whereupon the entire device is removed from position and the tube 13 is disengaged from the cylinder so that the contents of the cylinder and the tube may be deposited in another receptacle or container.

As many changes could be made in the above construction and many apparently widely different embodiments of this invention could be made without departing from the scope thereof, it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent, is:—

1. A device of the character described including a supporting frame designed for removable engagement with the neck of a bottle, a cylinder slidably mounted on the frame, a cream conducting tube connected to the bottom of the cylinder and communicating therewith and adapted to be removably arranged within the neck of the bottle, a valve seat formed at the lower end of the tube, a check valve disposed within the tube and resting on the seat, and a piston carried by the frame and arranged within the cylinder whereby when the cylinder and tube are moved downwardly on the frame a suction will be created in the cylinder to raise the valve and draw cream into the tube and cylinder.

2. A device of the character described including a supporting frame for engagement with the neck of a bottle, a cylinder slidably mounted on the frame, a cream conducting tube having one end removably connected to and communicating with the bottom of the cylinder, a frusto-conical valve seat formed on the outer end of the tube, a check valve mounted within the tube and normally resting on the seat, guarding means for the valve for preventing undue movement thereof, a piston rod depending from the top of the frame, and a piston carried by the outer end of the rod and arranged within the cylinder whereby when the cylinder is moved downwardly on the frame so as to move the tube in a corresponding direction a suction will be created in the cylinder so as to raise the valve means and draw cream into the tube and cylinder.

3. A device of the character described including a supporting frame embodying an annular band adapted for engagement with the shoulder of the neck of a bottle, a frusto-conical flange integral with and extending exteriorly of the band, spaced vertical rods removably connected upon opposite sides of the flange and extending upwardly therefrom, a handle connecting the rods and integral therewith at the upper ends thereof, a cylinder slidably mounted on the rods and limited in its downward movement by the flange, a cream conducting tube having one end removably connected to the bottom of the cylinder and arranged for sliding movement and in close relation with the band so as to be guided thereby, check valve means mounted at the outer end of the tube, a piston rod depending from the handle, a piston mounted on the outer end of the rod and arranged within the cylinder whereby when the cylinder is moved downwardly so as to move the tube in a corresponding direction a suction will be created so as to open the valve means and draw cream into the tube and cylinder.

In testimony whereof I affix my signature.

LEVI B. WARREN.

Copies of this patent may be obtained for five cents each, by addressing the "Commissioner of Patents, Washington, D. C."